June 16, 1964  J. ISREELI  3,137,480
VARIABLE GRADIENT DEVICE
Filed April 26, 1962  2 Sheets-Sheet 1

INVENTOR.
JACK ISREELI
BY Harry Cohen
ATTORNEY

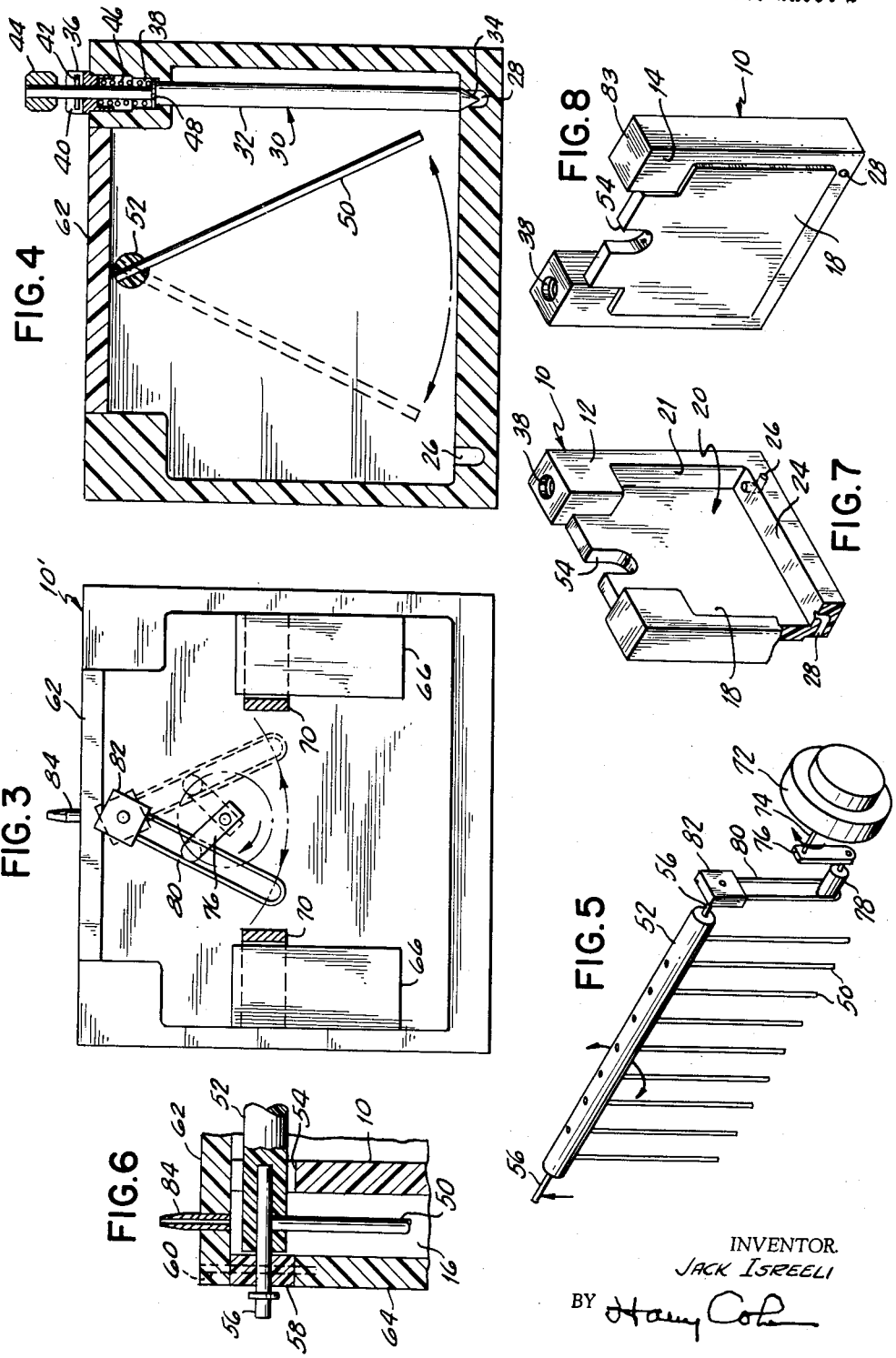

though the device can be provided with any number of chambers 16 so that the effluent supplied to the chromatography column from the device can have gradient curves of concentrations which vary over a wide range.

3,137,480
VARIABLE GRADIENT DEVICE
Jack Isreeli, Tuckahoe, N.Y., assignor to Technicon Chromatography Corporation, Chauncey, N.Y., a corporation of New York
Filed Apr. 26, 1962, Ser. No. 190,357
9 Claims. (Cl. 259—63)

This invention relates to a variable gradient device especially useful in chromatographic analysis.

The technique of gradient elution in chromatography requires that the eluent or buffer, which is introduced into the chromatography column at the top thereof and flows downwardly through the column for eluting the various zones of the chromatogram, be of varying concentrations in order to improve resolution in certain zones. A variable gradient device providing continuous varying concentrations of eluent to a chromatography column is described in an article by E. A. Peterson and H. A. Sober entitled "Variable Gradient Device For Chromatography" which appeared in the May 1959 issue of Analytical Chemistry. Essentially, the device consists of a series of identical mixing chambers which contain eluent of varying composition in hydrostatic equilibrium. The chambers are in fluid flow communication with each other and the eluent is removed from a chamber at one of the ends of a series of chambers causing the liquids in each of the other chambers to flow into the succeeding chamber, in a continuous fashion, so that the concentration of each liquid in each of the chambers is continuously changing and the concentration of the effluent which is being removed from the chamber at the end of the series is also varying in a continuous manner. The shape of the gradient curve or concentration of the effluent supplied to the chromatography column may be varied over a wide range by varying the concentrations of the liquid in the mixing chambers in the manner described in the aforementioned article.

One of the objects of the present invention is to provide a variable gradient device which is constructed in a manner whereby the device can be readily provided with any number of mixing chambers required or desired, simply and inexpensively.

Another object of the invention is to provide a variable gradient device which can be readily assembled from preformed chamber forming units, preferably units which can be molded of a suitable plastic and are non-tubular.

A further object is to provide a variable gradient device with readily accessible valves to open and close flow communication between adjacent chambers.

Another object is to provide a variable gradient device in which the liquids flow from one chamber to the other of the series under the influence of gravity and wherein means are provided to prevent contamination of the liquids in the chambers due to the presence of contaminants in the atmosphere.

A further object is to provide an improved variable gradient device which is especially well adapted to provide various gradients of concentrations of liquid, in a continuous manner, to a chromatography column and which is simple in construction and inexpensive to manufacture, and yet provides extremely accurate results.

The above and other objects, features and advantages of this invention will be more fully understood from the following description of the invention considered in connection with the accompanying illustrative drawings of the presently preferred embodiment of the invention.

In the drawings:

FIG. 3 is a vertical view taken on line 3—3 of FIG. 2;

FIG. 4 is a vertical sectional view taken on line 4—4 of FIG. 2;

FIG. 5 is a perspective view, partly diagrammatic, showing part of the device;

FIG. 6 is a sectional view of part of the device taken on line 6—6 of FIG. 1;

FIG. 7 is a perspective view of a part of the device, illustrating the front thereof; and FIG. 8 is a perspective view of the part of the device shown in FIG. 7 and illustrating the back thereof.

Figure 1:
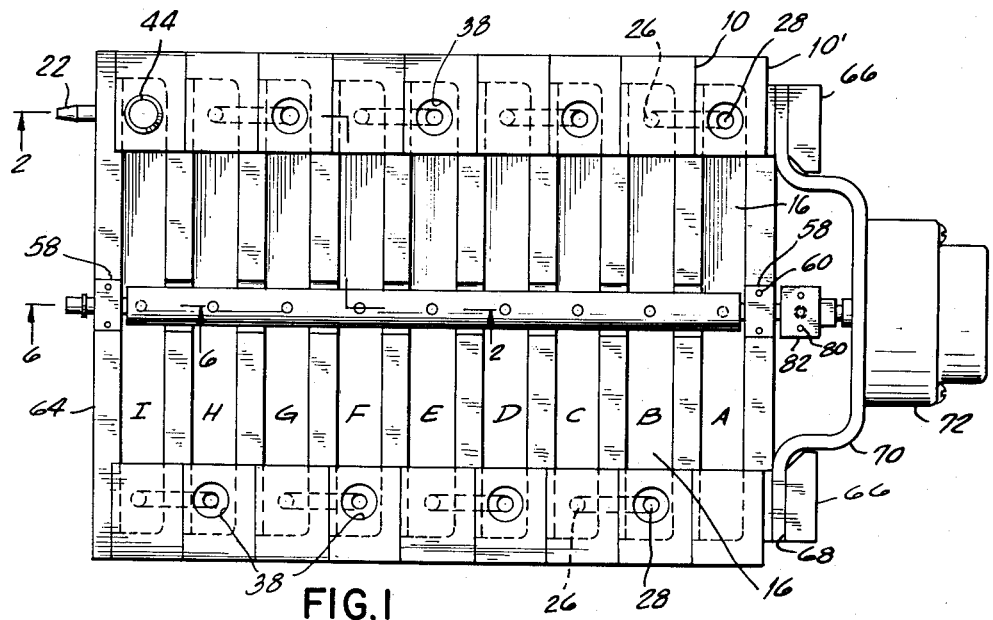
FIG. 1 is a top plan view of a variable gradient device in accordance with the present invention.

Referring now to the drawings in detail, the variable gradient device comprises a series of molded chamber forming members 10 of a suitable material, for example material sold under the trademark "Plexiglas" or "Lucite." The members are arranged with the front surface 12 of one member in surface-to-surface contact with the rear surface 14 of the adjacent member to form a series of longitudinally spaced rectangular chambers 16 for the liquids.

Each member has a rear wall 18 which extends rearwardly and beyond surface 14 into a recess 20 provided in the front of the adjacent member. The peripheral edge of the wall engages the adjacent edge portions 21 of the adjacent member, so that the members are supported in nested relation within each other, and the chambers are formed between the rear surface of wall 18 of one member and the front surface of said wall of an adjacent member. The members are secured to each other, as by cementing, along the contacting surfaces 12 and 14. It will be readily apparent that the device can be provided with any number of chambers 16 so that the effluent supplied to the chromatography column from the device can have gradient curves of concentrations which vary over a wide range.

Each of the chamber forming members has a bottom 24 provided with a liquid inlet passage 26 and a liquid outlet passage 28 which is laterally spaced from the inlet passage transversely of chamber 16. As shown herein, there are nine chambers identified by the letters A, B, C, D, E, F, G, H and I, but it will be understood that the number of chambers may vary and may consist of any number from two or more, as explained above. The inlet passage 26 in each member 10 is in registry with the outlet passage 28 of the adjacent member and the outlet passage 28 of each member is in registry with the inlet passage 26 of the other adjacent member 10. To accomplish this, alternate members have the positions of their inlet and outlet passages 26 and 28 reversed from the positions shown in FIGS. 7 and 8, as indicated in FIG. 1. The arrangement of the passages permits the liquid in chamber A to flow transversely of the chamber, in one direction, to its outlet passage 28 and into the adjacent chamber B, through the latter's inlet passage 26, and to flow transversely of chamber B in a direction which is opposite to the direction of flow in chamber A to its outlet passage 28 and into the inlet passage 26 of the adjacent chamber C, etc. In this manner, liquid flows in succession from chamber A through each of the other chambers to chamber I from which it is discharged, to the chromatography column through outlet 22. During this liquid flow, the concentration of the liquid in each of chambers B through I is varying continuously and effluent of continuingly varying concentration is transmitted to the chromatography column. Variable gradients of concentration of eluent may be obtained, as indicated above, by varying the concentration of liquid which is placed into any one or more of the chambers when the chambers are filled with liquid before the commencement of the operation of the device.

Each of the outlet passages 28 of the chambers is provided with a valve member 30 for closing or opening the corresponding outlet passage. Each valve member comprises an elongated vertical rod 32 which extends from the top of the partition member downwardly through the associated chamber 16 and has a tapered end 34 which is adapted to be seated in the countersunk inlet end of outlet passage 28 for closing said passage. The upper end of the rod is mounted for sliding longitudinal movement in a threaded member 36 which is screwed into the upper threaded part of a hole 38 provided in the member 10. The upper part of the threaded member 36 is provided with a pair of diametrically opposed vertical slots 40 and the upper end of rod 32 is provided with a pair of diametrically opposed pins 42 which are adapted to fit into the slots. A knurled knob 44 is secured to the upper end of rod 32 and a compression coil spring 46 extends between the bottom of threaded member 36 and a ring 48 provided on rod 32 for biasing the latter downwardly to seat the valve end 34 to close passage 28. To open the passage, rod 32 is lifted vertically upwardly so that pins 42 are above the upper surface of member 36 to permit rotation of the rod. In the rotated position of the rod, the pins engage the top surface of member 36 and retain the rod in its up position to keep passage 28 open.

Figure 2:
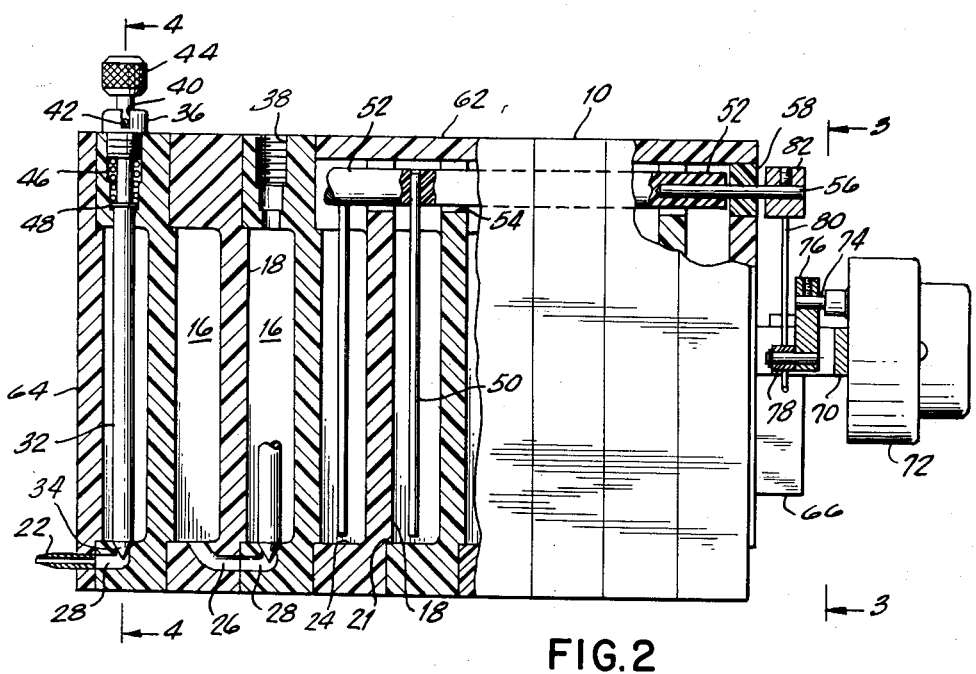
FIG. 2 is a vertical view of the device, partly in section, and with a part thereof shown in vertical section taken along the line 2—2 of FIG. 1.

A mixing rod 50 is provided for each of the liquid chambers for mixing the liquid therein. More particularly, a horizontal rotary shaft 52 extends longitudinally of the chambers along the upper part thereof through slots 54 provided in the rear walls 18 of the members 10. Each end of the shaft is provided with a longitudinally extending pin 56 which is journaled in a bearing 58 provided at each end of the device. One of the bearings is supported in the slot 54 of member 10' by a pair of laterally spaced pins 60 which extend upwardly from the member into the bearing and extend from the upper surface of the latter to provide locating pins for a cover 62. The bearing at the opposite end of the device is supported in a similar manner except that an end plate 64 is provided in which the bearing is mounted. The end plate and the member 10 adjacent thereto and to which it is secured, as by cementing, form the last chamber I and the outlet nipple 22 is provided in said end plate in communication with outlet passage 28, as best seen in FIG. 2. The mixing rods 50 for the chambers are suitably connected to shaft 52 and are longitudinally spaced from each other and extend downwardly into their corresponding chambers. While chamber A does not contain different liquids so that mixing is not necessary, nevertheless the chamber is provided with a rod 50 so that its volume is the same as the volume of the other chambers.

The stirring rod shaft 52 is operated so that the stirring rods 50 swing back and forth transversely through the chamber, in windshield wiper fashion, for mixing the liquid in the respective chamber. For this purpose, a pair of laterally spaced support blocks 66 are secured to the wall 18 of partition member 10'. The blocks are provided with vertically extending slots 68 and a U-shaped support bracket 70 is mounted in the slots. A motor 72 is secured to the bracket and the drive shaft 74 of the motor is connected to one end of a link 76. The opposite end of the link carries a roller 78 which extends into a U-shaped link 80 in driving contact with the latter. The free ends of link 80 are connected to a block 82 which is secured to the end of the adjacent pin 56.

As clearly shown in FIG. 3, operation of the motor results in a swinging oscillating back and forth movement of link 80 which causes stirrer rod shaft 52 to move similarly, whereby the stirrer rods 50 swing back and forth in their respective chambers for stirring the liquid therein.

As indicated above, a cover 62 is provided for the chambers and pins 60 extend through holes provided in the ends of the cover for positioning of the cover on the top surfaces 83 of the partition members 10. A nipple 84 extends through one end of the cover and is in communication with chamber I and each of the other chambers through slots 54, so that the chambers are in communication with the atmosphere to permit the flow of liquid from one chamber to the other under the influence of gravity. In the event that the atmosphere contains substances which might adversely affect the liquids in the chambers, an inert gas can be supplied to the chambers by connecting the nipple through tubing to a suitable source of the inert gas.

This application is related to my copending application Serial No. 60,174 filed October 3, 1960.

While I have shown and described the preferred embodiment of the invention, it will be understood that the invention may be embodied otherwise than as herein specifically illustrated or described, and that certain changes in the form and arrangement of parts and in the specific manner of practicing the invention may be made without departing from the underlying idea or principles of this invention without the scope of the appended claims.

What is claimed is:

1. A variable gradient device, comprising:
   (a) a series of separate and individual members which are substantially uniform and are arranged in back-to-front relation and connected to each other to form a series of longitudinally spaced substantially uniform chambers for the valve-controlled flow of liquid from the bottom of a chamber into an adjacent chamber,
   (b) each of said members having integral parts in engagement with integral parts of an adjacent member for supporting said members in said relation and thereby forming said series of chambers, and
   (c) valve means for each of said chambers to control said flow of liquid from one chamber to an adjacent chamber.

2. A variable gradient device, comprising:
   (a) a series of separate and individual members which are substantially uniform and are arranged in back-to-front relation and connected to each other to form a series of longitudinally spaced chambers for the valve-controlled flow of liquid from the bottom of a chamber into an adjacent chamber,
   (b) each of said members having a projecting rear wall and a recess opposite said wall and in confronting relation therewith so that in said back-to-front relation of said members, said projecting wall of one member extends into said recess of the adjacent member for supporting said members in said relation and thereby forming said series of chambers, and
   (c) valve means for each of said chambers to control said flow of liquid from one chamber to an adjacent chamber.

3. A variable gradient device, comprising:
   (a) a series of separate and individual members which are substantially uniform and are arranged in back-to-front relation and connected to each other to form a series of longitudinally spaced chambers for the valve-controlled flow of liquid from the bottom of a chamber into an adjacent chamber,
   (b) each of said members having integral parts in engagement with integral parts of an adjacent member for supporting said members in said relation and thereby forming said series of chambers,
   (c) each of said members having a bottom provided with a pair of laterally spaced liquid passages providing a liquid inlet and a liquid outlet for the corresponding chamber, said passages being in liquid flow communication with corresponding passages in the adjacent member,
   (d) said inlet and outlet being positioned in the member so that the incoming liquid flows transversely of the chamber from its inlet to its outlet,
   (e) mixing means for each of said chambers movable transversely of the chamber for mixing the liquid as it flows in said chamber from said inlet to said outlet, and (f) valve means for each of said chambers to control said flow of liquid from one chamber to an adjacent chamber.

4. A variable gradient device, comprising:

(a) a series of separate and individual members which are substantially uniform and are arranged in back-to-front relation and connected to each other to form a series of longitudinally spaced chambers for the valve-controlled flow of liquid from the bottom of a chamber into an adjacent chamber, (b) each of said members having integral parts in engagement with integral parts of an adjacent member for supporting said members in said relation and thereby forming said series of chambers, (c) each of said members having a bottom provided with a pair of laterally spaced liquid passages providing a liquid inlet and a liquid outlet for the corresponding chamber, said passages being in liquid flow communication with corresponding passages in the adjacent member, (d) said inlet and outlet being positioned in the member so that the incoming liquid flows transversely of the chamber from its inlet to its outlet, (e) mixing means for each of said chambers movable transversely of the chamber for mixing the liquid as it flows in said chamber from said inlet to said outlet, and (f) a valve member for each of said first mentioned members extending through the latter toward the bottom thereof for engaging one of said passages to control the flow of liquid therein.

5. A variable gradient device, comprising:

(a) a series of separate and individual pre-formed unitary members arranged in back-to-front relation and connected to each other to form a series of longitudinally spaced chambers for the valve-controlled flow of liquid from the bottom of a chamber into an adjacent chamber, (b) each of said members having a projecting rear wall and a recess opposite said wall and in confronting relation therewith so that in said back-to-front relation of said members, said projecting wall of one member extends into said recess of the adjacent member for supporting said members in said relation, (c) each of said members having a bottom provided with a pair of laterally spaced liquid passages providing a liquid inlet and a liquid outlet for the corresponding chamber, said passages being in liquid flow communication with corresponding passages in the adjacent member, (d) said inlet and outlet being positioned in the member so that the incoming liquid flows transversely of the chamber from its inlet to its outlet, (e) mixing means for each of said chambers movable transversely of the chamber for mixing the liquid as it flows in said chamber from said inlet to said outlet, and (f) a valve member for each of said first mentioned members extending through the latter toward the bottom thereof for engaging one of said passages to control the flow of liquid therein.

6. A variable gradient device, comprising:

(a) a series of separate and individual preformed members arranged in back-to-front relation and connected to each other to form a series of longitudinally spaced chambers for the valve-controlled flow of liquid from the bottom of a chamber into an adjacent chamber, (b) each of said members having a bottom provided with a pair of laterally spaced liquid passages providing a liquid inlet and a liquid outlet for the corresponding chamber, said passages being in liquid flow communication with corresponding passages in the adjacent member, (c) said inlet and outlet being positioned in the member so that the incoming liquid flows transversely of the chamber from its inlet to its outlet, (d) mixing means for each of said chambers movable transversely of the chamber for mixing the liquid as it flows in said chamber from said inlet to said outlet, and (e) a valve member for each of said first mentioned members extending through the latter toward the bottom thereof for engaging one of said passages to control the flow of liquid therein.

7. A variable gradient device, comprising:

(a) a series of separate and individual members arranged in back-to-front relation and connected to each other to form a series of longitudinally spaced chambers for the valve-controlled flow of liquid from the bottom of a chamber into an adjacent chamber, (b) each of said members having a bottom provided with a pair of laterally spaced liquid passages providing a liquid inlet and a liquid outlet for the corresponding chamber, said passages being in liquid flow communication with corresponding passages in the adjacent member, (c) said inlet and outlet being positioned in the member so that the incoming liquid flows transversely of the chamber from its inlet to its outlet, and (d) a valve member for each of said first members extending through the latter toward the bottom thereof for engaging one of said passages to control the flow of liquid therein.

8. A variable gradient device, comprising:

(a) a series of separate and individual members arranged in back-to-front relation and connected to each other to form a series of longitudinally spaced chambers for the valve-controlled flow of liquid from the bottom of a chamber into an adjacent chamber, (b) a cover removably mounted on said members and covering said chambers so that the liquid therein is not exposed to the atmosphere, (c) said cover having means for transmitting a gaseous fluid to said liquid in said chambers to permit said liquid flow, and (d) valve means for each of said chambers to control said flow of liquid from one chamber to an adjacent chamber.

9. A variable gradient device, comprising:

(a) a series of separate and individual members arranged in back-to-front relation and connected to each other to form a series of longitudinally spaced chambers for the valve-controlled flow of liquid from the bottom of a chamber into an adjacent chamber, (b) a cover removably mounted on said members and covering said chambers so that the liquid therein is not exposed to the atmosphere, (c) said cover having means for transmitting a gaseous fluid to said liquid in said chambers to permit said liquid flow, (d) each of said members having a projecting rear wall and a recess opposite said wall and in confronting relation therewith so that in said back-to-front relation of said members, said projecting wall of one member extends into said recess of the adjacent member for supporting said members in said relation, (e) each of said members having a bottom provided with a pair of laterally spaced liquid passages providing a liquid inlet and a liquid outlet for the corresponding chamber, said passages being in liquid flow communication with corresponding passages in the adjacent member, (f) said inlet and outlet being positioned in the member so that the incoming liquid flows transversely of the chamber from its inlet to its outlet,
(g) mixing means for each of said chambers movable transversely of the chamber for mixing the liquid as it flows in said chamber from said inlet to said outlet, and
(h) a valve member for each of said first mentioned members extending through the latter toward the bottom thereof for engaging one of said passages to control the flow of liquid therein.

References Cited in the file of this patent

UNITED STATES PATENTS

| | | |
|---|---|---|
| 931,025 | Amend | Aug. 17, 1909 |
| 1,107,765 | Davis | Aug. 18, 1914 |
| 2,807,280 | Kittredge | Sept. 24, 1957 |
| 2,941,546 | Cowherd | June 21, 1960 |

FOREIGN PATENTS

| | | |
|---|---|---|
| 10,639 | Great Britain | of 1886 |